United States Patent
Wang et al.

(10) Patent No.: US 12,513,376 B2
(45) Date of Patent: Dec. 30, 2025

(54) METHOD AND APPARATUS FOR SINGLE-PIXEL THERMAL IMAGING DETECTION OF SURFACE AND INTERNAL DEFECTS OF MATERIAL

(71) Applicant: HUNAN UNIVERSITY, Changsha (CN)

(72) Inventors: Hongjin Wang, Changsha (CN); Yunze He, Changsha (CN); Xiang Li, Changsha (CN); Baoyuan Deng, Changsha (CN); Yaonan Wang, Changsha (CN)

(73) Assignee: HUNAN UNIVERSITY, Changsha (CN)

( * ) Notice: Subject to any disclaimer, the term of this patent is extended or adjusted under 35 U.S.C. 154(b) by 0 days.

(21) Appl. No.: 18/829,827

(22) Filed: Sep. 10, 2024

(65) Prior Publication Data
US 2025/0373914 A1     Dec. 4, 2025

(30) Foreign Application Priority Data
May 31, 2024 (CN) ......................... 202410692680.1

(51) Int. Cl.
| | |
|---|---|
| *H04N 23/11* | (2023.01) |
| *G01J 3/28* | (2006.01) |
| *G06T 7/00* | (2017.01) |
| *H04N 23/21* | (2023.01) |

(52) U.S. Cl.
CPC ............ *H04N 23/11* (2023.01); *G01J 3/2823* (2013.01); *G06T 7/0004* (2013.01); *H04N 23/21* (2023.01); *G06T 2207/10048* (2013.01)

(58) Field of Classification Search
None
See application file for complete search history.

(56) References Cited

U.S. PATENT DOCUMENTS

2015/0281543 A1* 10/2015 Wen ............... H03M 7/3062
                                                      348/222.1

OTHER PUBLICATIONS

J.-Y. Wu, S. Sfarra and Y. Yao, "Sparse Principal Component Thermography for Subsurface Defect Detection in Composite Products," in IEEE Transactions on Industrial Informatics, vol. 14, No. 12, pp. 5594-5600, Dec. 2018 (Year: 2018).*

(Continued)

*Primary Examiner* — Stefan Gadomski

(57) ABSTRACT

Provided are a method and apparatus for single-pixel thermal imaging detection of surface and internal defects of a material. The laser module is configured to generate uniform laser light. The spatial light modulation module is configured to spatially encode and modulate received uniform laser light. The projection lens module is configured to project and amplify an encoded light field, and project the encoded light field onto a surface of an object under detection. The optical convergence coupling module is configured to capture and image thermal radiation of the object under detection, and integrate and sum thermal radiation intensities of a projection heating area to obtain a thermal radiation temperature. The thermal infrared single-pixel detector is configured to measure the thermal radiation temperature. The image reconstruction module is configured to sparsely reconstruct data, and finally reconstruct a defect detection result of the projection heating area.

10 Claims, 2 Drawing Sheets

(56) References Cited

OTHER PUBLICATIONS

D. Roy, P. Babu and S. Tuli, "Sparse Reconstruction-Based Thermal Imaging for Defect Detection," in IEEE Transactions on Instrumentation and Measurement, vol. 68, No. 11, pp. 4550-4558, Nov. 2019 (Year: 2019).*

* cited by examiner

METHOD AND APPARATUS FOR SINGLE-PIXEL THERMAL IMAGING DETECTION OF SURFACE AND INTERNAL DEFECTS OF MATERIAL

CROSS REFERENCE TO RELATED APPLICATION

This patent application claims the benefit and priority of Chinese Patent Application No. 2024106926801, filed with the China National Intellectual Property Administration on May 31, 2024, the disclosure of which is incorporated by reference herein in its entirety as part of the present application.

TECHNICAL FIELD

The present disclosure relates to the technical field of single-pixel imaging, and in particular, to a method and apparatus for single-pixel thermal imaging detection of surface and internal defects of a material.

BACKGROUND

As an important branch of the nondestructive testing field, thermal imaging detection technology can be used to detect surface and internal defects of various metals and composite materials, and is widely used in aerospace, wind power manufacturing, power device monitoring and other fields. Active thermal imaging technology includes a controlled excitation source, which is applied to a surface or an interior of an object under detection, generally takes surface radiation heat transfer as a mainstream, and is implemented by various radiation sources, including a halogen lamp, a flashlight, a laser, and the like. The radiation source can be encoded and modulated in time domain or space domain, so that a heat flow input to a surface of the object under detection is accompanied by encoded information, and a more complicated heat conduction process is performed inside. Internal defects of materials may produce a dynamic response of a corresponding surface temperature field under the excitation of encoded signals. Generally, a thermal imager with an infrared focal plane array as a core is used to collect temperature field data of the object surface, and directly collect a three-dimensional temperature map sequence in an entire field of view, and then a corresponding feature extraction algorithm is used to perform enhancement processing on a defect image. At present, regardless of a cooling type or a non-cooling type, infrared thermal imagers with high temperature measurement accuracy and high resolution are generally expensive, which makes application costs of thermal imaging detection technology higher.

In recent years, with the development of computational imaging technology, single pixel imaging technology has gradually attracted widespread attention. This technology originated from a ghost imaging phenomenon, and then gradually improves with the introduction of a compressed sensing theory. Single-pixel imaging obtains information only through one pixel, but the collected information is spatially encoded, which can be performed in two ways: a spatial light modulator projects encoded structured light onto the surface of the object, or a light field reflected by the object is encoded and then reflected. encoded light field information is collected by a single pixel after integration and summation. This collection method is performed many times, each time with different encoded information, and then an object scene is calculated and imaged by using a sparse reduction algorithm. Single-pixel imaging has been applied in terahertz, infrared and X-band fields and other fields and is suitable for occasions where it is difficult to integrate a planar array sensor or the planar array sensor is high in cost.

At present, an infrared camera based on a microbolometer operates in an infrared band of 7-14 μm (also referred to as far-infrared), and it is difficult to implement spatial light modulation in this band. At present, most single-pixel imaging technologies focus on a near-infrared band, and an overall architecture thereof is similar to that of a single-pixel camera in a visible light band. Since low-cost spatial light modulators such as a near-infrared digital micromirror device (DMD) are available in a near-infrared band, the usual practice is to replace a spatial modulator in a visible band with a near-infrared band. This architecture can only be used to passively observe an object and does not involve the application of active excitation.

A patent CN117998184A discloses a dual-band differential single-molecule computing single-pixel imaging apparatus. In this apparatus, a laser is only configured for illumination, while a DMD is configured to spatially encode information reflected by an object after illumination by a light source and reflect encoded information into a single-pixel detector. This architecture can only passively image the object, but cannot actively thermally image the object. At present, there is no spatial light modulator that can operate in a far-infrared band. Therefore, this apparatus is not suitable for thermal imaging detection of surface and internal defects of a material.

SUMMARY

Against the technical problem to be solved by the present disclosure, to overcome the shortcomings of the above background, a method and apparatus for single-pixel thermal imaging detection of surface and internal defects of a material are provided, to combine an encoded structured light projection mode of single-pixel imaging with a radiation heating active thermal imaging mode, and achieve a good effect of detecting surface and internal defects of a material.

The technical solution adopted by the present disclosure to solve the technical problem is that a method for single-pixel thermal imaging detection of surface and internal defects of a material includes the following steps:

S1: generating laser light in a near-infrared band;

S2: generating m mutually independent Bernoulli random matrices with a size of $\sqrt{n} \times \sqrt{n}$, where n represents a number of elements of a Bernoulli random matrix, and m represents a number of the Bernoulli random matrices;

S3: measuring a temperature field of a to-be-projected heating area on a surface of an object under detection, and summing measured temperatures to obtain an initial temperature value $T_{i0}$, where i=1, 2, ..., m;

S4: spatially encoding the laser light by using one of the Bernoulli random matrices generated in step S2, projecting the spatially encoded laser light to a projection heating area on the surface of the object under detection, and heating the surface of the object under detection by using the spatially encoded laser light;

S5: measuring a temperature field of the projected heating area on the surface of the object under detection, summing measured temperatures to obtain a heating temperature value $T_i$, and calculating $T_{di}=T_i-T_{i0}$, where i=1, 2, ..., m;

S6: removing heating laser light on the surface of the object under detection, that is, skipping heating the object under detection, and keeping for a time $t_h$, so as to restore the object under detection to be close to the initial temperature before heating;

S7: repeating steps S3 to S6, sequentially using different Bernoulli random matrices, and forming vectors $T_d$ of m×1 by using $T_{di}$ calculated each time;

S8: sequentially vectorizing the m Bernoulli random matrices to sequentially form a row vector of 1×n, a row vector of 1×n formed by vectorization of the $i^{th}$ Bernoulli random matrix being expressed as $\phi_i$, and then forming a matrix $\Phi$ by all row vectors, where $\Phi \in R^{m \times n}$, $R^{m \times n}$ represents a real number set matrix of m×n, and an $i^{th}$ row of the matrix $\Phi$ is a row vector $\phi_i$;

S9: generating an inverse discrete cosine matrix $\Psi$ of n×n, setting a to-be-solved sparse vector x, where $x \in R^{n \times 1}$, and $R^{n \times 1}$ represents a real number set vector of n×1, and forming a target problem $\Phi\Psi x = T_d$;

S10: solving the following objective function by using an optimization algorithm:

$$\min\|x\|_1 \text{ s.t. } \Phi\Psi x = T_d$$

where $\|\cdot\|_1$ represents a vector 1-norm, that is, the sum of absolute values of all elements; and S11: after the sparse vector x is obtained, calculating a to-be-reconstructed data vector $b = \Psi x$, and matrixing the obtained vector b to obtain a reconstructed detection image.

Further, in step S4, before the laser light is spatially encoded, the laser light is sequentially homogenized, collimated and amplified.

Further, in step S5, being close to the initial temperature before heating means being within 1.5° C. from the initial temperature before last heating.

An apparatus for single-pixel thermal imaging detection of surface and internal defects of a material includes a laser module, a spatial light modulation module, a projection lens module, an optical convergence coupling module, a thermal infrared single-pixel detector and an image reconstruction module, where the laser module is configured to generate laser light with a uniform radiation density and provide an initial uniform light source for the spatial light modulation module;

the spatial light modulation module is configured to spatially encode and modulate received uniform laser light and project modulated laser light to the projection lens module;

the projection lens module is configured to project and amplify an encoded light field modulated by the spatial light modulation module, and project the encoded light field onto a surface of an object under detection, which is equivalent to heat flow input and causes heat conduction inside the material;

the optical convergence coupling module is configured to capture and image thermal radiation of the object under detection caused by a temperature change, and integrate and sum thermal radiation intensities of a projection heating area to obtain a thermal radiation temperature;

the thermal infrared single-pixel detector is configured to measure the thermal radiation temperature to obtain a thermal radiation temperature value; and the image reconstruction module is configured to sparsely reconstruct data measured by the thermal infrared single-pixel detector, and finally reconstruct a defect detection result of the projection heating area.

Further, the laser module includes a laser generator, an end collimator and a laser beam expander, the laser generator is configured to generate near-infrared band laser light, the laser light is transmitted to the end collimator through optical fiber coupling, the laser light subjected to optical fiber coupling has a uniform emergent radiation density, the end collimator is configured to collimate the uniform laser light, and the laser beam expander is configured to amplify parallel light with a small diameter collimated by the end collimator.

Further, the spatial light modulation module includes a spatial light modulator and a driving board, the spatial light modulator is configured to spatially encode and modulate the received uniform laser light and is controlled by the driving board; and the driving board is responsible for providing a power supply and control signals required by the spatial light modulator, and after being controlled, the spatial light modulator spatially encodes and modulates the uniform laser light and projects modulated laser light to the projection lens module.

Further, a Bernoulli random matrix is adopted for the spatial encoding and modulation.

Further, the projection lens module is a thermal infrared imaging lens.

Further, the optical convergence coupling module includes an integrating lens, the integrating lens is configured to integrate and sum the thermal radiation intensities of the projection heating area to obtain the thermal radiation temperature, and a cold stop capable of shielding an area outside the projection heating area is arranged at an entrance pupil part of the integrating lens.

Further, a process of data reconstruction by the image reconstruction module includes the following:

assuming that measurement is performed for m times in total, where projected Bernoulli random matrices have a size of $\sqrt{n} \times \sqrt{n}$, m represents a number of Bernoulli random matrices, and n represents a number of elements of a Bernoulli random matrix, sequentially vectorizing each Bernoulli random matrix to sequentially form a row vector of 1×n, the row vector of 1×n formed by vectorization of the $i^{th}$ Bernoulli random matrix being expressed as di, and then forming a matrix $\Phi$ by all row vectors, where $\Phi \in R^{m \times n}$, $R^{m \times n}$ represents a real number set vector of m×n, and an $i^{th}$ row of the matrix $\Phi$ is a row vector $\phi_i$; generating an inverse discrete cosine matrix $\Psi$ of n×n, setting a to-be-solved sparse vector x, where $x \in R^{n \times 1}$, and $R^{n \times 1}$ represents a real number set vector of n×1, and forming a target problem $\Phi\Psi x = T_d$; and solving the following objective function by using an optimization algorithm:

$$\min\|x\|_1 \text{ s.t. } \Phi\Psi x = T_d$$

where $\|\cdot\|_1$ represents a vector 1-norm, that is, the sum of absolute values of all elements; and after the sparse vector x is obtained, calculating a to-be-reconstructed data vector $b = \Psi x$, and matrixing the obtained vector b to obtain a reconstructed detection image.

Compared with the prior art, the present disclosure has the following advantages:

According to the present disclosure, by combination of an encoded structured light projection mode of single-pixel imaging with a radiation heating active thermal imaging mode, active radiation thermal imaging is performed on surface and internal defects of a material by using a single pixel, and the surface and internal defects of a material of an object under detection are subjected to thermal imaging detection through computational imaging by combining a single-point temperature measuring pixel with active radiation excitation, thereby achieving a good effect of detecting the surface and internal defects of a material.

Figure 1:
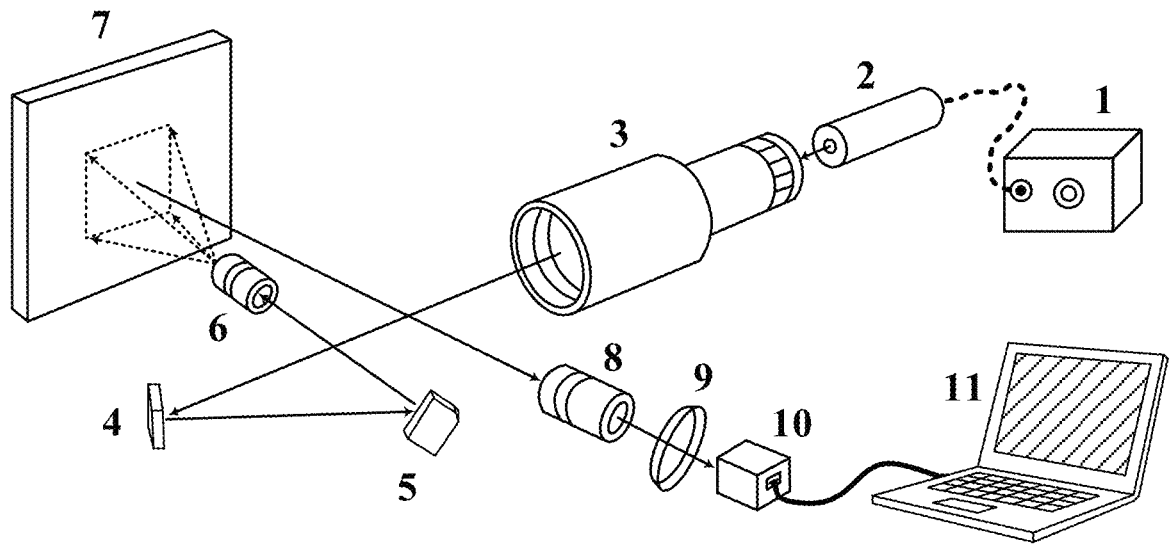
FIG. 1 is a schematic structural diagram of an apparatus for single-pixel thermal imaging detection of surface and internal defects of a material according to an embodiment of the present disclosure.

1: Laser generator, 2: End collimator, 3: Laser beam expander, 4: Reflector, 5: DMD, 6: Near-infrared projection objective, 7: object under detection, 8: Thermal infrared imaging lens, 9: Integrating lens, 10: Thermal infrared single-pixel detector, 11: Computer.

DETAILED DESCRIPTION OF THE EMBODIMENTS

The present disclosure is further described in detail below with reference to the accompanying drawings and specific embodiments.

A method for single-pixel thermal imaging detection of surface and internal defects of a material according to this embodiment includes the following steps.

S1: Generate near-infrared band laser light with a good heating effect, where a wavelength thereof is generally 808 nm, and power needs to be determined according to requirements for an object under detection.

S2: Generate m mutually independent Bernoulli random matrices with a size of $\sqrt{n}\times\sqrt{n}$, where n represents a number of elements of a Bernoulli random matrix, a value of n determines a number of image pixels, and m represents a number of the Bernoulli random matrices; and a larger value of m generally indicates better quality of a reconstructed image, but is generally far less than the number of the elements of a Bernoulli matrix. For example, a Bernoulli matrix of 60×60 has 3,600 elements, and the value of m may be set to 500-1,000.

S3: Measure a temperature field of a to-be-projected heating area on a surface of an object under detection, and sum measured temperatures to obtain an initial temperature value $T_{i0}$, where i=1, 2, ..., m.

S4: Spatially encode the laser light by using one of the Bernoulli random matrices generated in step S2, project the spatially encoded laser light to a projection heating area on the surface of the object under detection, and heat the surface of the object under detection by using the spatially encoded laser light; before the laser light is spatially encoded, sequentially homogenize, collimate and amplify the laser light; and continuously heat the surface of the object under detection for a certain time $t_s$, where a value of $t_s$ depends on sample detection requirements and laser power, and generally, higher laser power indicates a shorter time required for irradiation and heating. Too short $t_s$ does not produce enough temperature rise.

S5: Measure a temperature field of the projected heating area on the surface of the object under detection, sum measured temperatures to obtain a heating temperature value $T_i$, and calculate $T_{di}=T_i-T_{i0}$, where i=1, 2, ..., m.

S6: Remove heating laser light on the surface of the object under detection, that is, skip heating the object under detection, and keep for a time $t_h$, so as to make the object under detection fully dissipate heat, and prevent heat residual from affecting introduction of errors into next measurement. $t_h$ depends on the residual heat, and generally needs to restore to be close to the initial temperature before heating. In this embodiment, being close to the initial temperature before heating specifically means being within 1.5° C. from the initial temperature before last heating.

S7: Repeat steps S3 to S6, sequentially use different Bernoulli random matrices, and form vectors $T_d$ of m×1 by using $T_{di}$ calculated each time.

S8: Sequentially vectorize the m Bernoulli random matrices to sequentially form a row vector of 1×n, a row vector of 1×n formed by vectorization of the $i^{th}$ Bernoulli random matrix being expressed as $\phi_i$, and then form a matrix $\Phi$ by all row vectors, where $\Phi \in R^{m\times n}$, $R^{m\times n}$ represents a real number set matrix of m×n, and an $i^{th}$ row of the matrix $\Phi$ is a row vector $\phi_i$.

S9: Generate an inverse discrete cosine matrix $\Psi$ of n×n, set a to-be-solved sparse vector x, where $x \in R^{n\times 1}$, and $R^{n\times 1}$ represents a real number set vector of n×1, and form a target problem $\Phi\Psi x=T_d$.

S10: Solve the following objective function by using an optimization algorithm:

$$\min\|x\|_1 \text{ s.t. } \Phi\Psi x = T_d$$

where $\|\cdot\|_1$ represents a vector 1-norm, that is, the sum of absolute values of all elements.

S11: After the sparse vector x is obtained, calculate a to-be-reconstructed data vector $b=\Psi x$, and matrix the obtained vector b to obtain a reconstructed detection image.

An apparatus for single-pixel thermal imaging detection of surface and internal defects of a material according to the present disclosure includes a laser module, a spatial light modulation module, a projection lens module, an optical convergence coupling module, a thermal infrared single-pixel detector and an image reconstruction module.

The laser module is configured to generate laser light with a uniform radiation density and provide an initial uniform light source for the subsequent spatial light modulation module. Generally, an emergent light spot of a laser generator has a small diameter, and needs to be amplified by a beam expander to be adjusted to an appropriate size matching the spatial light modulator.

The spatial light modulation module includes a spatial light modulator and a driving board. The spatial light modulator is configured to spatially encode and modulate the received uniform laser light and is controlled by the driving board. The driving board is responsible for providing a power supply and control signals required by the spatial light modulator, and after being controlled, the spatial light modulator spatially modulates the uniform laser light and projects modulated laser light to the projection lens module.

The projection lens module is configured to project and amplify an encoded light field modulated by the spatial light modulation module, and project the encoded light field onto a surface of an object under detection, which is equivalent to heat flow input and causes heat conduction inside the material.

The optical convergence coupling module is configured to capture and image thermal radiation of the object under detection caused by a temperature change, and integrate and sum thermal radiation intensities of a projection heating area to obtain a thermal radiation temperature value. The optical convergence coupling module includes a thermal infrared imaging lens and an integrating lens. The thermal infrared imaging lens is configured to capture and image thermal radiation of the object under detection caused by a temperature change, and the integrating lens cooperates with a field stop to integrate and sum thermal radiation intensities of a projection heating area to obtain a thermal radiation temperature.

The thermal infrared single-pixel detector is placed at a focal part of the integrating lens to measure the thermal radiation temperature of the projection heating area to obtain the thermal radiation temperature value.

The image reconstruction module is configured to sparsely reconstruct data measured by the thermal infrared single-pixel detector, and finally reconstruct a defect detection result of the projection heating area.

Referring to FIG. 1, the apparatus for single-pixel thermal imaging detection of surface and internal defects of a material according to this embodiment specifically includes a laser generator 1, an end collimator 2, a laser beam expander 3, a reflector 4, a DMD 5, a near-infrared projection objective 6, an object 7 under detection, a thermal infrared imaging lens 8, an integrating lens 9, a thermal infrared single-pixel detector 10 and a computer 11.

The laser generator 1, the end collimator 2, the laser beam expander 3 and the reflector 4 form the laser module.

The laser generator 1 is configured to generate near-infrared band laser light with a good heating effect, where a wavelength thereof is generally 808 nm, and power needs to be determined according to requirements for an object under detection.

The laser beam is transmitted to the end collimator 2 through optical fiber coupling, and the laser light subjected to optical fiber coupling has a uniform emergent radiation density. The emergent light spot generally has a small diameter, which is about 4 mm. The laser light directly emitted from an optical fiber has a certain divergence angle, and the laser light is collimated by the end collimator 2 to form parallel light with uniform energy distribution and a small diameter. In addition to the optical fiber, the beam may be shaped and homogenized by a microlens array to generate parallel light with uniform energy distribution.

The laser beam expander 3 amplifies the small-diameter parallel light collimated by the end collimator 2, and a Kepler or Galileo beam expander may be selected. The beam diameter needs to be expanded to cover an operating area of the DMD 5. A Kepler beam expander with magnification of 8× is configured in the figure, and the emitted laser beam is still uniform parallel light.

In order to make an entire system layout reasonable, the reflector 4 in a near-infrared band is used to deflect the beam, and a dielectric film reflector is selected as the reflector 4 to reflect and deflect the expanded laser beam. The reflected beam is projected to the DMD 5.

The DMD 5 spatially encodes the parallel light source projected by the reflector 4 to obtain spatially encoded laser light. The spatially encoded laser light is patterned laser light. A Bernoulli random matrix is used for spatial encoding, and a binary mask image is produced according to the Bernoulli random matrix. The DMD 5 is controlled by a corresponding driving board. The driving board is connected to an upper computer (personal computer (PC)) through a universal serial bus (USB), can transmit and store the binary mask image and drive the DMD 5 to generate a corresponding binary deflection. The DMD 5 irradiates spatially encoded laser light to the projection heating area on the surface of the object under detection, and heats the object under detection by radiation heat transfer. m Bernoulli random matrices are generated, and are independent of each other. Each element of the matrix obeys binomial distribution, that is, with a 50% probability of 0 or 1, corresponding to all black and all white of the binary mask image. The size $\sqrt{n} \times \sqrt{n}$ of the matrix depends on resolution required for reconstruction. For example, to obtain a detection image with a resolution of 60×60, the size of a matrix projected by the DMD 5 is 60×60. Each projection pattern is a different randomly-generated Bernoulli matrix, and projection needs to be performed for m times in total. Generally, a larger value of m indicates better quality of a reconstructed image, but the value is generally far less than a number of elements of a Bernoulli matrix. For example, a Bernoulli matrix of 60×60 has 3,600 elements, and the value of m may be set to 500-1,000. Each time the DMD 5 projects a pattern, the projection needs to be kept for a time, and then the DMD is unloaded and turned all black, that is, no pattern is projected, and the object under detection is not heated, and this is kept for a time. Keeping the projection for a time can fully heat a surface of a sample, and then projecting no pattern is for fully dissipating heat from the sample, so as to prevent heat residual from affecting introduction of errors into next measurement. A time for continuous irradiation and heat dissipation depends on sample detection requirements and laser power. Generally, higher laser power indicates a shorter time required for irradiation and heating, while a too short heating time does not produce enough temperature increase. The heat dissipation time after each projection depends on residual heat, and the temperature generally needs to be restored to be close to the initial temperature before heating.

The DMD 5 of this embodiment may alternatively be replaced by other spatial light modulators that can be encoded.

The near-infrared projection objective 6 projects and amplifies the encoded laser light projected by the DMD 5, and the encoded laser light is projected onto the surface of the object 7 under detection, which is equivalent to heat flow input and causes heat conduction inside the material.

The thermal infrared imaging lens 8 projects the amplified encoded laser light onto the surface of the object 7 under detection, which is equivalent to heat flow input and causes heat conduction inside the material. Since imaging in a thermal infrared band is performed, a thermal infrared lens is needed, and there is no fixed requirement for a focal length and a field of view. The field of view needs to be greater than the projection heating area (indicated by a dashed box in FIG. 1). In FIG. 1, an infrared lens with a focal length of 25 mm is taken as an example.

The integrating lens 9 is configured to integrate and sum the thermal radiation intensities of the projection heating area to obtain the thermal radiation temperature, and a cold stop capable of shielding an area outside the projection heating area needs to be arranged at an entrance pupil part of the integrating lens. The cold stop is placed at a focal plane of the thermal infrared imaging lens 8. For example, if the focal length of the lens is 25 mm, the cold stop is placed at a 25 mm position at the back of the lens. The stop should strictly match the projection heating area in shape and size. For example, if the projection heating area is a square area, the stop is also a square area with a corresponding proportion in a corresponding field of view of the infrared lens 8.

The thermal infrared single-pixel detector 10 is placed at a focal part of the integrating lens 9 to measure the thermal radiation temperature of the projection heating area to obtain the thermal radiation temperature value. When the DMD 5 heats the surface of the object 7 under detection, the thermal infrared single-pixel detector 10 collects data twice in each heating process, that is, a surface temperature sum $T_{i0}$ of the object 7 under detection before heating starts for the first time, and a surface temperature sum $T_i$ of the object 7 under detection after the heating ends for the second time, and then a difference between the two is calculated, that is, $T_{di}=T_{i0}-T_i$, i=1, 2, ..., m; and then saving is performed, that is, a measurement process is completed.

The laser light is spatially encoded by sequentially using different Bernoulli random matrices, the surface of the object 7 under detection is heated by using the spatially encoded laser light, and a vector $T_d$ of m×1 is formed by using $T_{di}$ calculated each time.

Data recording, control of the thermal infrared single-pixel detector and control of the DMD driving board can all be completed by the PC 11, and then data reconstruction needs to be performed. The image reconstruction module is provided in the PC, and the image reconstruction module is configured to sparsely reconstruct the vector $T_d$, and finally reconstruct a defect detection result of the projection heating area.

It is assumed that measurement is performed for m times in total, where projected Bernoulli random matrices have a size of $\sqrt{n} \times \sqrt{n}$, m represents a number of Bernoulli random matrices, and n represents a number of elements of a Bernoulli random matrix. Each Bernoulli random matrix is sequentially vectorized to sequentially form a row vector of 1×n, and the row vector of 1×n formed by vectorization of the $i^{th}$ Bernoulli random matrix is expressed as di. Then a matrix $\Phi$ is formed by all row vectors, where $\Phi \in R^{m \times n}$, $R^{m \times n}$ represents a real number set vector of m×n, and an $i^{th}$ row of the matrix $\Phi$ is a row vector $\phi_i$. An inverse discrete cosine matrix $\Psi$ of n×n is generated, and a to-be-solved sparse vector x is set, where $x \in R^{n \times 1}$, and $R^{n \times 1}$ represents a real number set vector of n×1. A target problem $\Phi \Psi x = T_d$ is formed. The following objective function is solved by using an optimization algorithm:

$$\min \|x\|_1 \text{ s.t. } \Phi \Psi x = T_d$$

where $\|\cdot\|_1$ represents a vector 1-norm, that is, the sum of absolute values of all elements.

This function may be solved multiple methods, and four methods suitable for reconstruction of thermal imaging results are enumerated herein.

The first method is an orthogonal matching pursuit (OMP) algorithm, which can directly solve the problem.

The second method is to transform the above function into a standard linear programming problem, and then an interior point method is used to solve the linear programming problem iteratively.

The third method is to transform the objective function into an inequality constraint problem considering noise:

$$\min \|x\|_1 \text{ s.t. } \|\Phi \Psi x - T_d\|_2 < \varepsilon$$

where $\varepsilon$ is a set threshold of noise, which may be set as an upper limit of a temperature measurement error of the thermal infrared single-pixel detector 10, and $\|\cdot\|_2$ represents a vector 2-norm, that is, a mean sum of square of an error between a measured value vector $T_d$ and a theoretical true value vector $\Phi \Psi x$. The inequality constraint problem considering noise can be transformed into a standard second-order cone programming (SOCP) problem, and then the problem is solved by an interior point iteration method.

The fourth method is to allow the inequality constraint problem considering noise to be equivalent to a least absolute shrinkage and selection operator (LASSO) problem:

$$\min \|\Phi \Psi x - T_d\|_2^2 + \lambda \cdot \|x\|_1$$

where $\lambda$ is a regularization parameter used to balance sparsity and errors. The LASSO problem can be solved by an alternating direction method of multipliers (ADMM) algorithm. In practice, it is necessary to adjust the parameter of $\lambda$ and solve the value for multiple times to determine an optimal result.

After the sparse vector x is obtained, a to-be-reconstructed data vector $b=\Psi x$ is calculated, and the obtained vector b is matrixed to obtain a reconstructed detection image.

Figure 2:
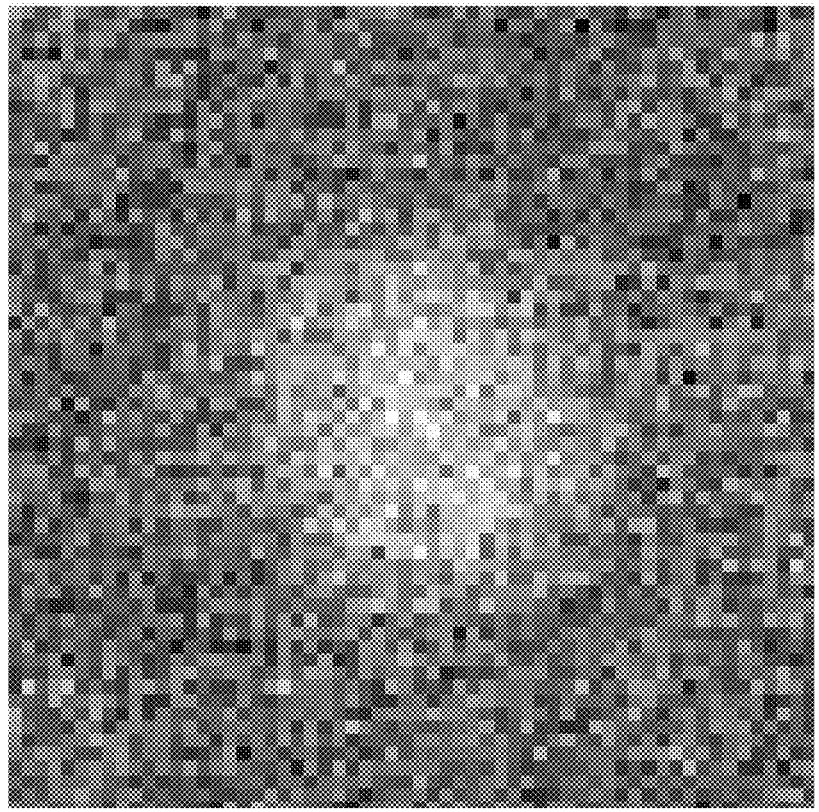
FIG. 2 shows a result of detecting a specimen internally containing a standard circular defect by using the present disclosure.
Figure 3:
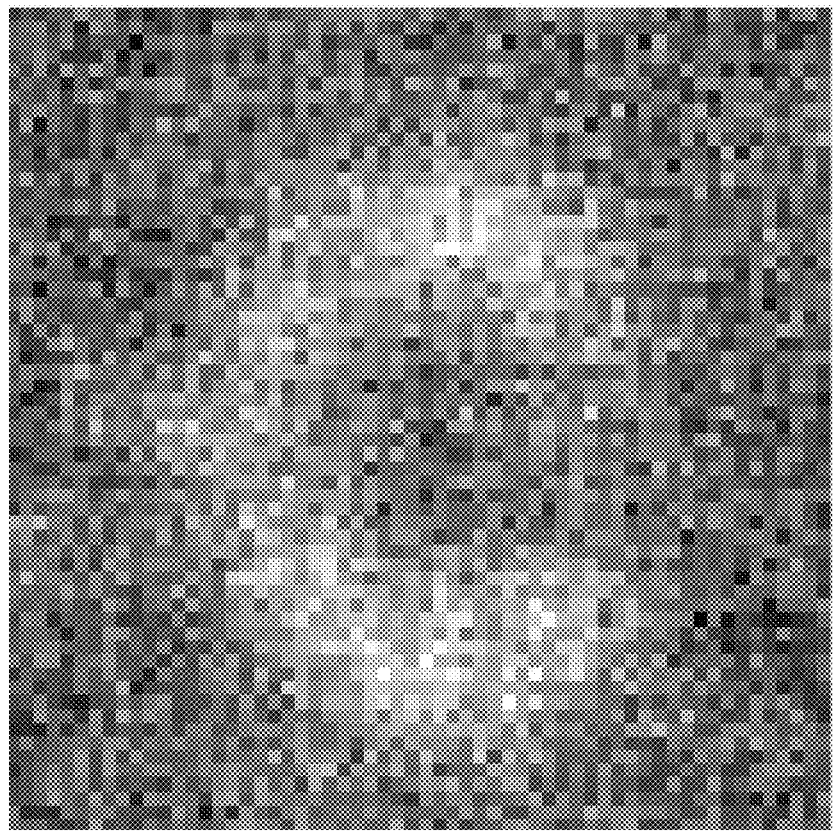
FIG. 3 shows a result of detecting a specimen with an internal detect in a more complicated shape (letter C) by using the present disclosure.

FIG. 2 shows a result of detecting a specimen internally containing a standard circular defect by using the present disclosure. FIG. 3 shows a result of detecting a specimen with an internal detect in a more complicated shape (letter C) by using the present disclosure. According to detection results, the shapes of surface and internal defects of a material can be clearly seen from the figure, and effects of detecting surface and internal defects of a material are good.

The present disclosure differs from conventional single-pixel imaging in that in the application of thermal imaging detection in the present disclosure, an excitation source such as a light source heats the object under detection, which causes abnormal heat conduction of internal defects, and then causes an abnormal surface temperature. According to the present disclosure, laser light generated by a radiant heating source and radiant light received by the thermal infrared single-pixel detector are in different bands. A near-infrared light source with a better heating effect is used as the radiant heating source. The thermal infrared single-pixel detector detects far-infrared light from internal thermal radiation of the object under detection, and the internal thermal radiation in the far-infrared band is converted into temperature data. The data collected by the thermal infrared single-pixel detection is surface temperature field distribution and does not directly correspond to structural light of the radiant heating source.

According to the present disclosure, by combination of an encoded structured light projection mode of single-pixel imaging with a radiation heating active thermal imaging mode, active radiation thermal imaging is performed on surface and internal defects of a material by using a single pixel, and the surface and internal defects of a material of an object under detection are subjected to thermal imaging detection through computational imaging by combining a single-point temperature measuring pixel with active radiation excitation, thereby achieving a good effect of detecting the surface and internal defects of a material.

Various modifications and variations may be made to the present disclosure by those skilled in the art, and such modifications and variations are within the scope of the present disclosure if these modifications and variations are within the scope of the claims and equivalent technologies thereof of the present disclosure.

The content not described in detail in the specification is prior art known to those skilled in the art.

What is claimed is:

1. A method for single-pixel thermal imaging detection of surface and internal defects of a material, comprising the following steps:

S1: generating laser light in a near-infrared band;

S2: generating m mutually independent Bernoulli random matrices with a size of $\sqrt{n} \times \sqrt{n}$, wherein n represents a number of elements of one of the Bernoulli random matrices, and m represents a number of the Bernoulli random matrices;

S3: measuring a temperature field of a to-be-projected heating area on a surface of an object under detection, and summing measured temperatures to obtain an initial temperature value $T_{i0}$, wherein i=1, 2, . . . , m;

S4: spatially encoding the laser light by using one of the Bernoulli random matrices generated in step S2, projecting the spatially encoded laser light to a projection heating area on the surface of the object under detection, and heating the surface of the object under detection by using the spatially encoded laser light;

S5: measuring a temperature field of the projected heating area on the surface of the object under detection, summing measured temperatures to obtain a heating temperature value $T_i$, and calculating $T_{di}=T_i-T_{i0}$, wherein i=1, 2, . . . , m;

S6: removing heating laser light on the surface of the object under detection, that is, skipping heating the object under detection, and keeping for a time $t_h$, so as to restore the object under detection to be close to the initial temperature before heating;

S7: repeating steps S3 to S6, sequentially using different ones of the Bernoulli random matrices, and forming vectors $T_d$ of m×1 by using $T_{di}$ calculated each time;

S8: sequentially vectorizing the m Bernoulli random matrices to sequentially form a row vector of 1×n, a row vector of 1×n formed by vectorization of the $i^{th}$ Bernoulli random matrix being expressed as $\phi_i$, and then forming a matrix $\Phi$ by all row vectors, wherein $\Phi \in R^{m \times n}$, $R^{m \times n}$ represents a real number set matrix of m×n, and an $i^{th}$ row of the matrix $\Phi$ is a row vector $\phi_i$;

S9: generating an inverse discrete cosine matrix $\Psi$ of n×n, setting a to-be-solved sparse vector x, wherein $x \in R^{n \times 1}$, and $R^{n \times 1}$ represents a real number set vector of n×1, and forming a target problem $\Phi \Psi x = T_d$;

S10: solving the following objective function by using an optimization algorithm:

$$\min \|x\|_1 \text{ s.t. } \Phi \Psi x = T_d$$

wherein $\|\cdot\|_1$ represents a vector 1-norm, that is, the sum of absolute values of all elements; and S11: after the sparse vector x is obtained, calculating a to-be-reconstructed data vector $b=\Psi x$, and matrixing the obtained vector b to obtain a reconstructed detection image.

2. The method for single-pixel thermal imaging detection of surface and internal defects of a material according to claim 1, wherein in step S4, before the laser light is spatially encoded, the laser light is sequentially homogenized, collimated and amplified.

3. The method for single-pixel thermal imaging detection of surface and internal defects of a material according to claim 1, wherein in step S5, being close to the initial temperature before heating means being within 1.5° C. from the initial temperature before last heating.

4. An apparatus for single-pixel thermal imaging detection of surface and internal defects of a material applied to the method according to claim 1, comprising a laser module, a spatial light modulation module, a projection lens module, an optical convergence coupling module, a thermal infrared single-pixel detector and an image reconstruction module, wherein the laser module is configured to generate laser light with a uniform radiation density and provide an initial uniform light source for the spatial light modulation module;

the spatial light modulation module is configured to spatially encode and modulate received uniform laser light and project modulated laser light to the projection lens module;

the projection lens module is configured to project and amplify an encoded light field modulated by the spatial light modulation module, and project the encoded light field onto a surface of an object under detection, which is equivalent to heat flow input and causes heat conduction inside the material;

the optical convergence coupling module is configured to capture and image thermal radiation of the object under detection caused by a temperature change, and integrate and sum thermal radiation intensities of a projection heating area to obtain a thermal radiation temperature;

the thermal infrared single-pixel detector is configured to measure the thermal radiation temperature to obtain a thermal radiation temperature value; and the image reconstruction module is configured to sparsely reconstruct data measured by the thermal infrared single-pixel detector, and finally reconstruct a defect detection result of the projection heating area.

5. The apparatus for single-pixel thermal imaging detection of surface and internal defects of a material according to claim 4, wherein the laser module comprises a laser generator, an end collimator and a laser beam expander, the laser generator is configured to generate near-infrared band laser light, the laser light is transmitted to the end collimator through optical fiber coupling, the laser light subjected to optical fiber coupling has a uniform emergent radiation density, the end collimator is configured to collimate the uniform laser light, and the laser beam expander is configured to amplify parallel light with a small diameter collimated by the end collimator.

6. The apparatus for single-pixel thermal imaging detection of surface and internal defects of a material according to claim 4, wherein the spatial light modulation module comprises a spatial light modulator and a driving board, the spatial light modulator is configured to spatially encode and modulate the received uniform laser light and is controlled by the driving board; and the driving board is responsible for providing a power supply and control signals required by the spatial light modulator, and after being controlled, the spatial light modulator spatially encodes and modulates the uniform laser light and projects modulated laser light to the projection lens module.

7. The apparatus for single-pixel thermal imaging detection of surface and internal defects of a material according to claim 4, wherein a Bernoulli random matrix is adopted for the spatial encoding and modulation.

8. The apparatus for single-pixel thermal imaging detection of surface and internal defects of a material according to claim 4, wherein the projection lens module is a thermal infrared imaging lens.

9. The apparatus for single-pixel thermal imaging detection of surface and internal defects of a material according to claim 4, wherein the optical convergence coupling module comprises an integrating lens, the integrating lens is configured to integrate and sum the thermal radiation intensities of the projection heating area to obtain the thermal radiation temperature, and a cold stop capable of shielding an area outside the projection heating area is arranged at an entrance pupil part of the integrating lens.

10. The apparatus for single-pixel thermal imaging detection of surface and internal defects of a material according to claim 7, wherein a process of data reconstruction by the image reconstruction module comprises the following:

assuming that measurement is performed for m times in total, wherein projected Bernoulli random matrices have a size of $\sqrt{n} \times \sqrt{n}$, m represents a number of Bernoulli random matrices, and n represents a number of elements of one of the Bernoulli random matrices, sequentially vectorizing each Bernoulli random matrix to sequentially form a row vector of 1×n, the row vector of 1×n formed by vectorization of the $i^{th}$ Bernoulli random matrix being expressed as $d_i$, and then forming a matrix $\Phi$ by all row vectors, wherein $\Phi \in R^{m \times n}$, $R^{m \times n}$ represents a real number set vector of m×n, and an $i^{th}$ row of the matrix $\Phi$ is a row vector $\phi_i$, generating an inverse discrete cosine matrix $\Psi$ of n×n, setting a to-be-solved sparse vector x, wherein $x \in R^{n \times 1}$, and $R^{n \times 1}$ represents a real number set vector of n×1, and forming a target problem $\Phi \Psi x = T_d$; and solving the following objective function by using an optimization algorithm:

$$\min \|x\|_1 \text{ s.t. } \Phi \Psi x = T_d$$

wherein $\|\cdot\|_1$ represents a vector 1-norm, that is, the sum of absolute values of all elements; and after the sparse vector x is obtained, calculating a to-be-reconstructed data vector $b = \Psi x$, and matrixing the obtained vector b to obtain a reconstructed detection image.

* * * * *